United States Patent
Sato et al.

(10) Patent No.: US 7,192,050 B2
(45) Date of Patent: Mar. 20, 2007

(54) SIDE AIRBAG

(75) Inventors: Yuji Sato, Aichi-ken (JP); Toshinori Tanase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 301 days.

(21) Appl. No.: 10/885,642

(22) Filed: Jul. 8, 2004

(65) Prior Publication Data
US 2005/0006883 A1   Jan. 13, 2005

(30) Foreign Application Priority Data
Jul. 9, 2003   (JP) ............................. 2003-272518
Sep. 10, 2003  (JP) ............................. 2003-318107

(51) Int. Cl.
*B60R 21/233* (2006.01)
(52) U.S. Cl. ................... 280/729; 280/743.1
(58) Field of Classification Search .............. 280/729, 280/730.2, 739, 742, 730.1
See application file for complete search history.

(56) References Cited

U.S. PATENT DOCUMENTS

| | | | | |
|---|---|---|---|---|
| 5,240,283 A | * | 8/1993 | Kishi et al. ................. | 280/729 |
| 5,427,410 A | * | 6/1995 | Shiota et al. ............ | 280/743.1 |
| 5,607,183 A | * | 3/1997 | Nishimura et al. ....... | 280/743.2 |
| 5,765,863 A | * | 6/1998 | Storey et al. ............... | 280/729 |
| 6,062,594 A | * | 5/2000 | Asano et al. ............ | 280/730.2 |
| 6,773,027 B2 | * | 8/2004 | Bohn et al. ................. | 280/729 |
| 2001/0003395 A1 | * | 6/2001 | Ariyoshi ..................... | 280/729 |

FOREIGN PATENT DOCUMENTS

JP   A-2000-280853   10/2000

* cited by examiner

*Primary Examiner*—David R. Dunn
*Assistant Examiner*—Drew J. Brown
(74) *Attorney, Agent, or Firm*—Posz Law Group, PLC

(57) ABSTRACT

A airbag main body is formed by sewing a pair of fabric sheets. The airbag main body is provided with a seam. The seam has passages for permitting gas in the airbag main body to pass therethrough. The seam divides the interior of the airbag main body into a main inflation chamber and a sub-inflation chamber. The sub-inflation chamber is inflated with gas that has flowed from the main inflation chamber and passed through the passages formed in the seam.

15 Claims, 11 Drawing Sheets

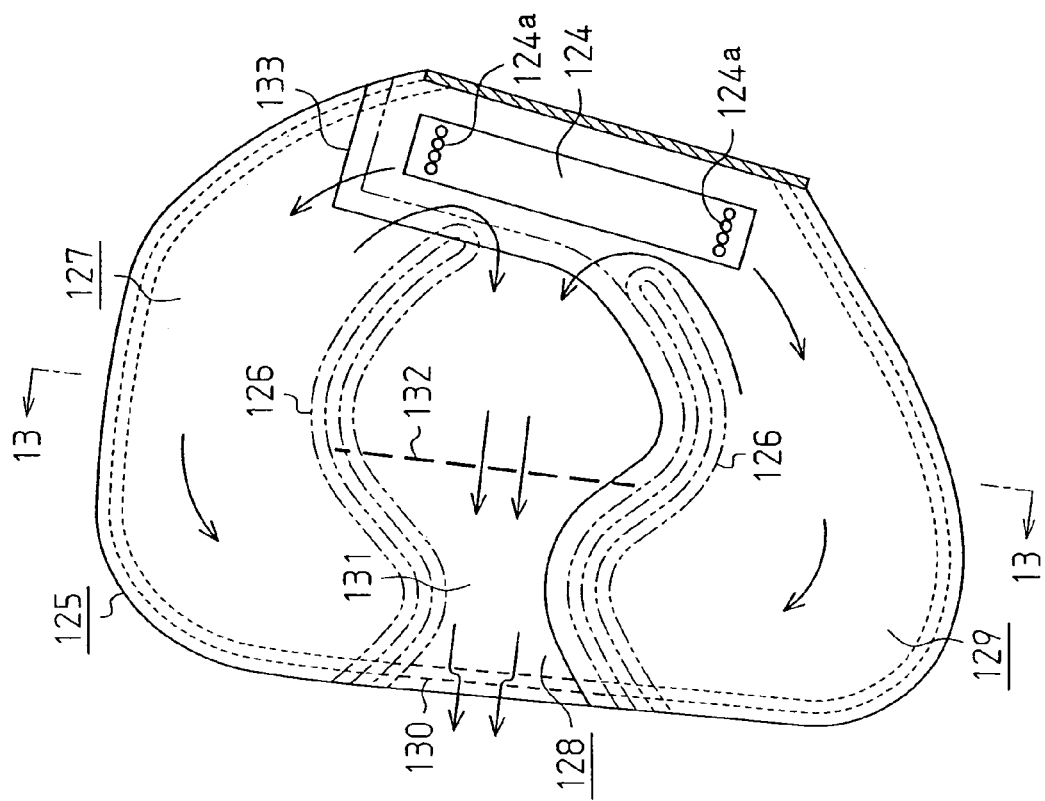
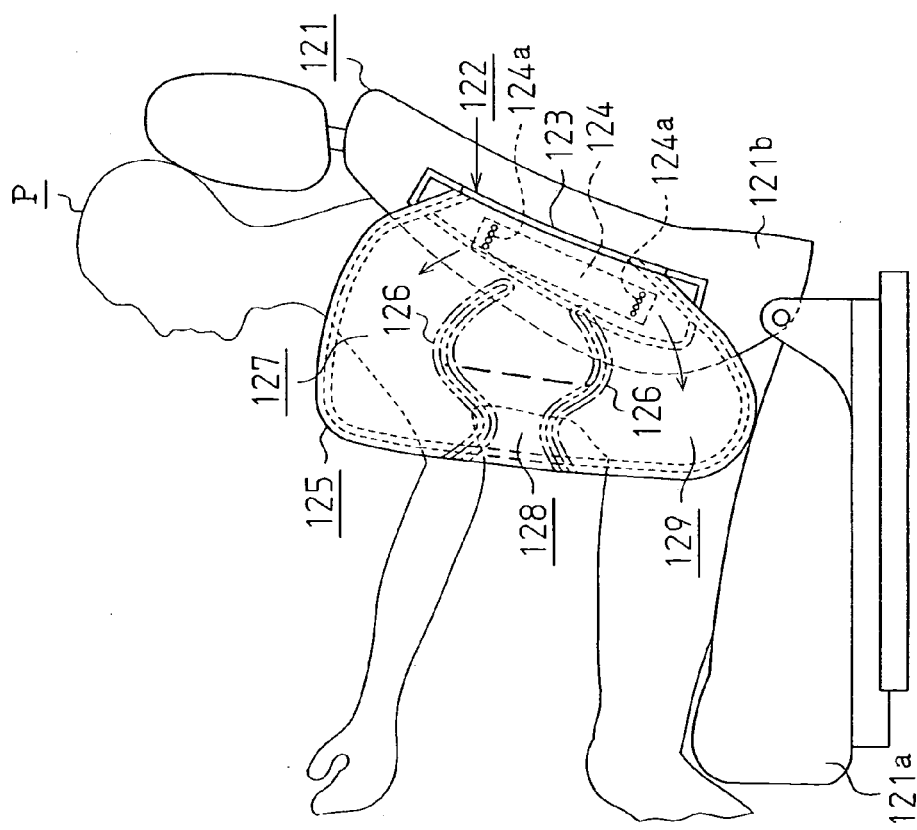

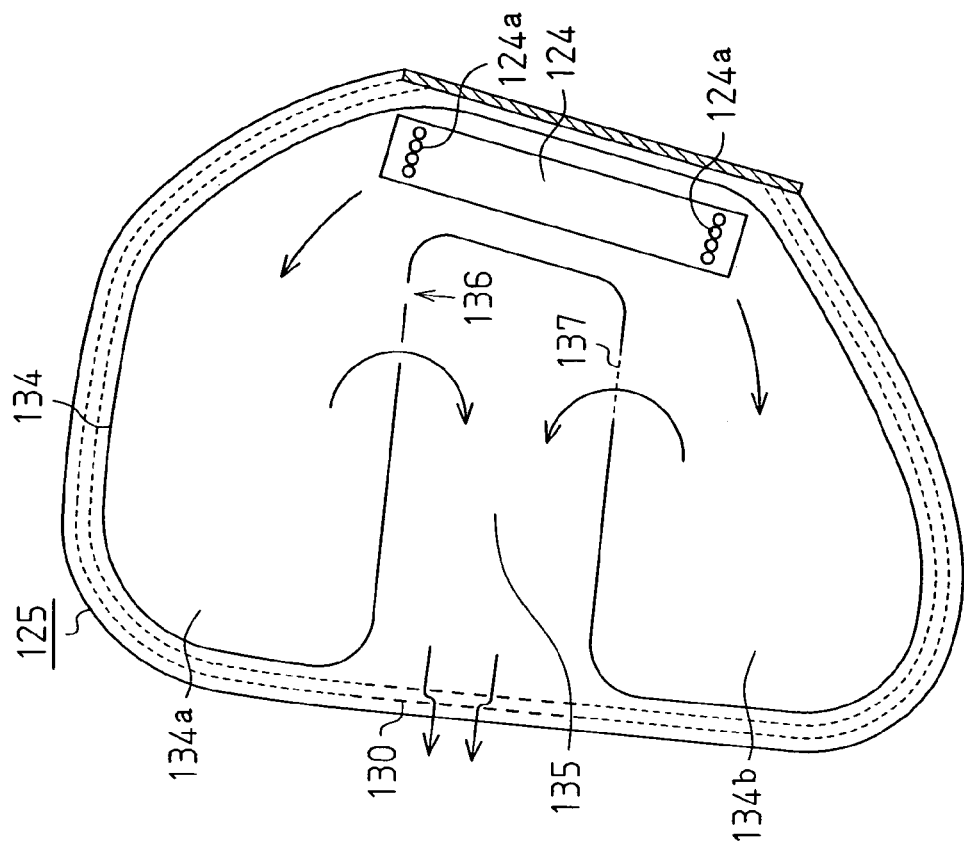
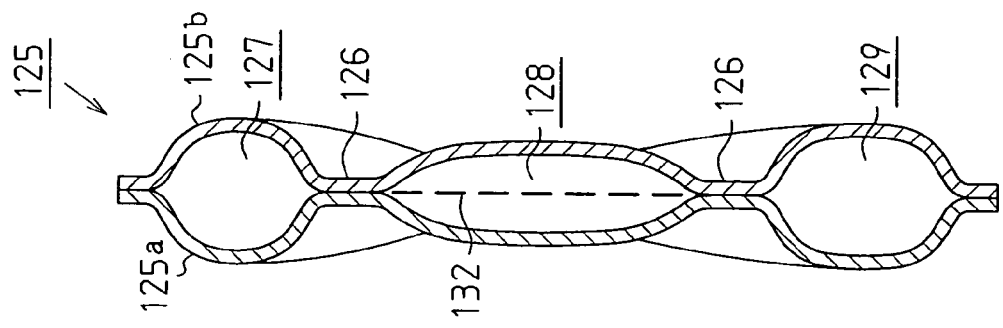

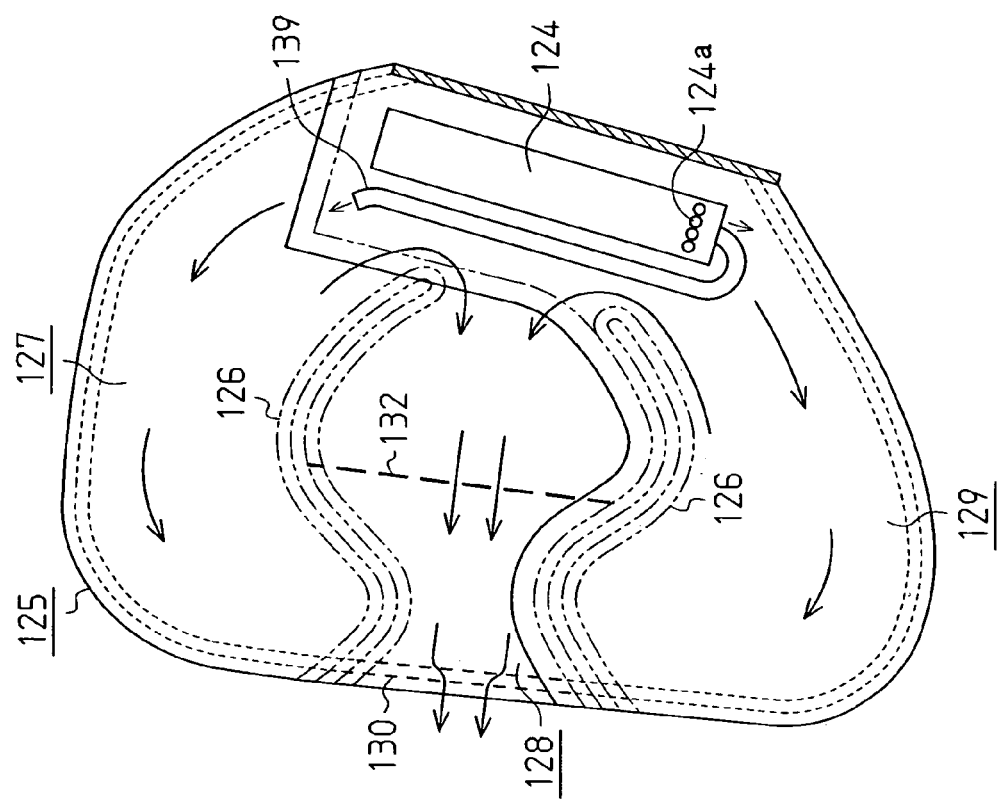
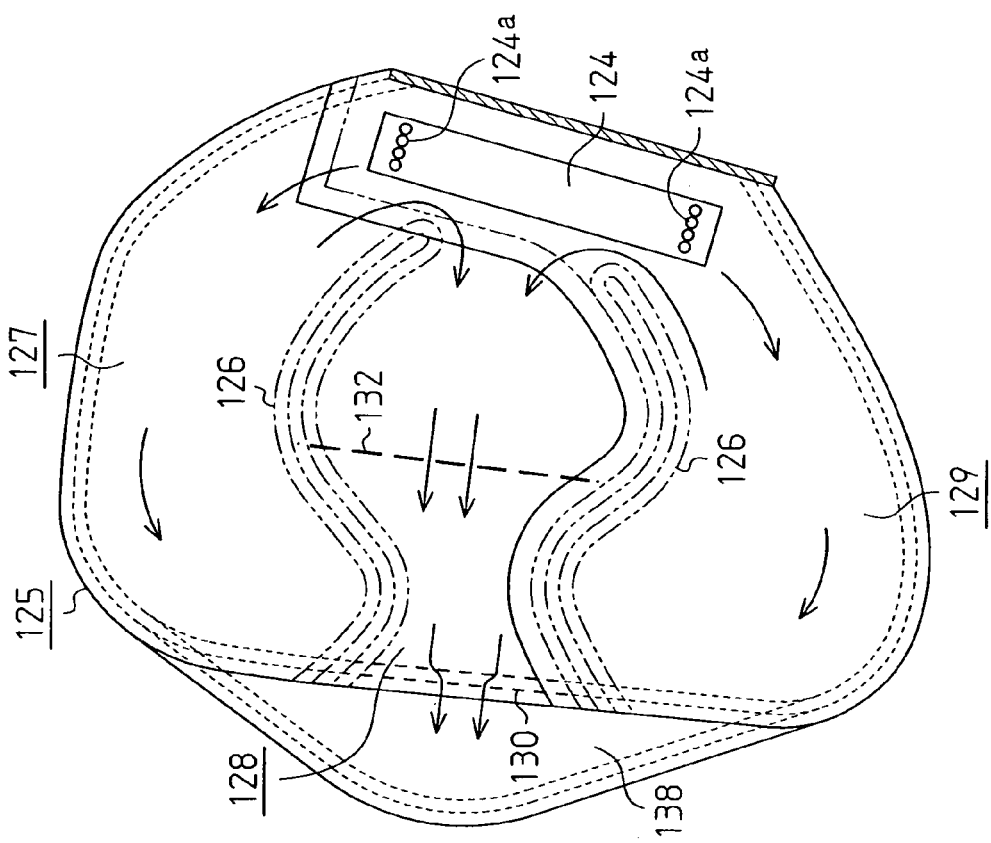

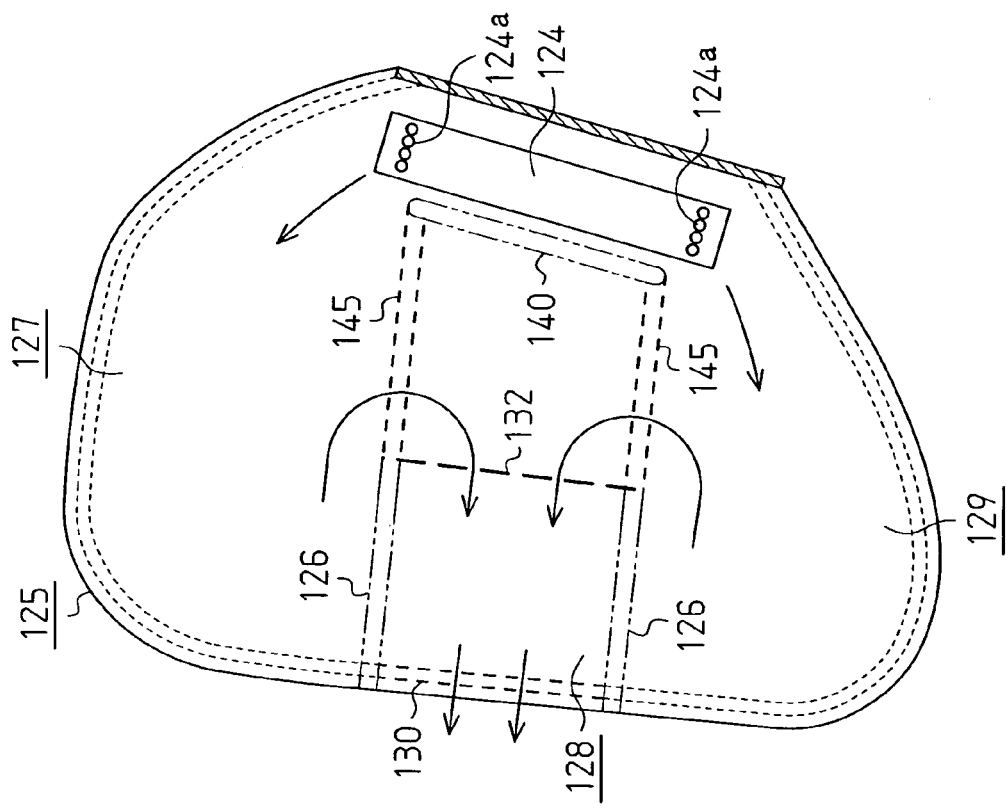
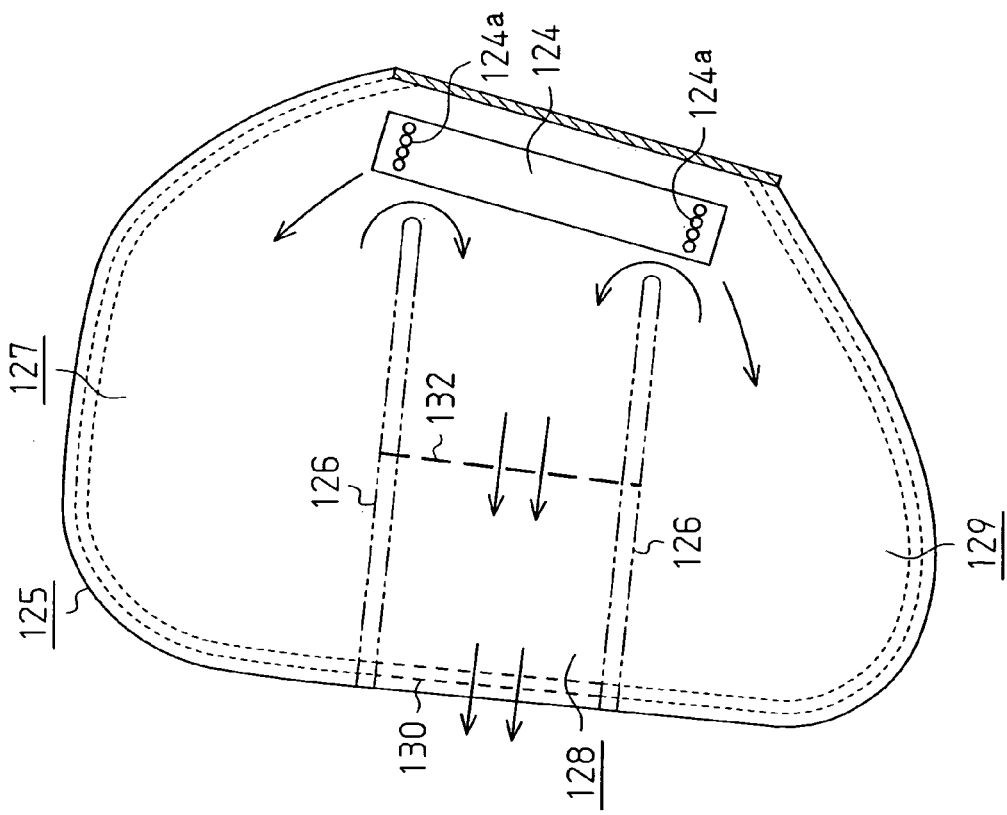

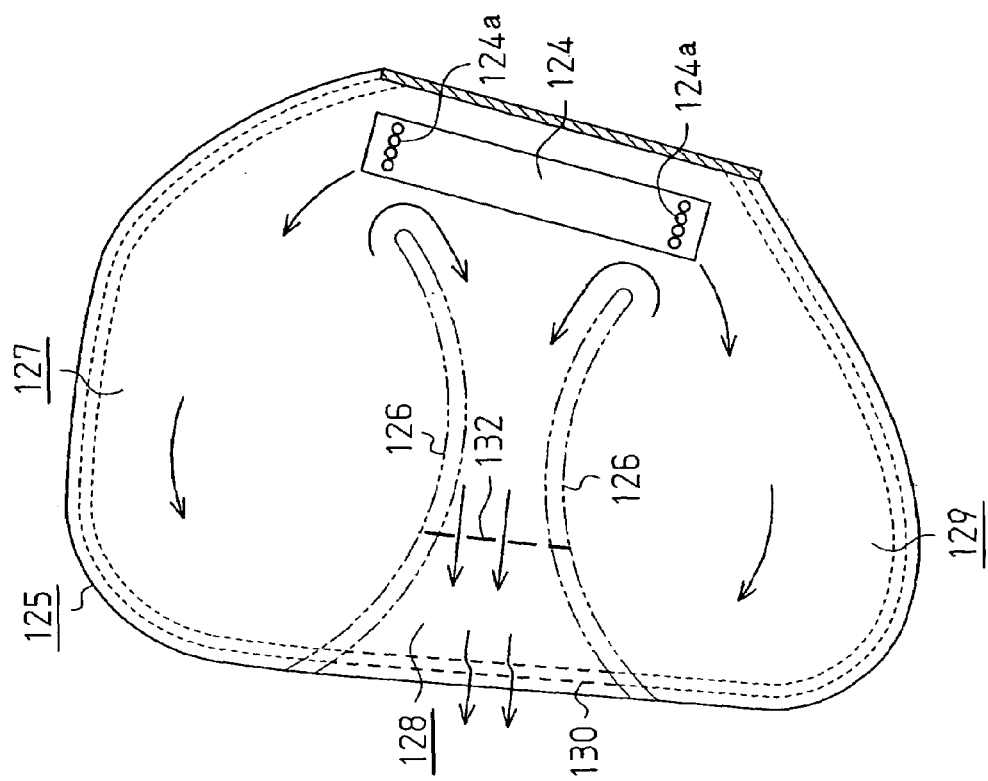
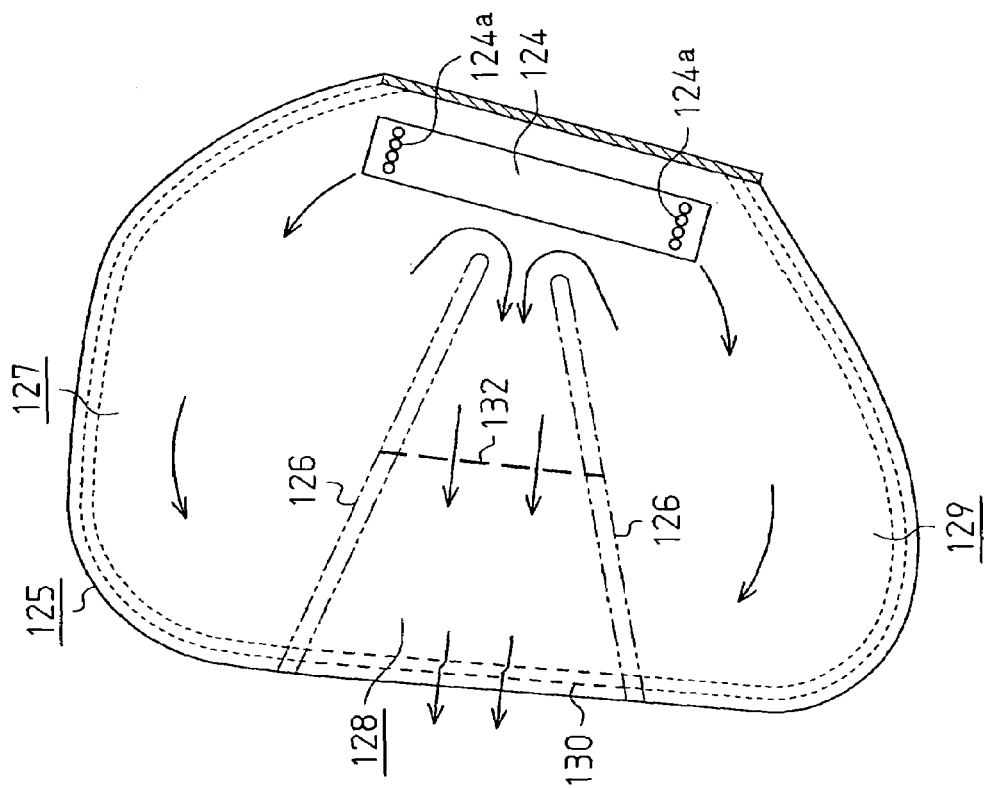

SIDE AIRBAG

BACKGROUND OF THE INVENTION

The present invention relates to a side airbag device that absorbs impacts applied to a side of a vehicle to protect an occupant.

For example, Japanese Laid-Open Patent Publication No. 2000-280853 discloses a side airbag apparatus having a side airbag. The interior of the side airbag is divided by a partition into a rear deployment zone and a front deployment zone. A part of the side airbag that corresponds to the rear deployment zone is inflated in a position rearward of an arm of an occupant. A part of the side airbag that corresponds to the front deployment zone contacts an arm of the occupant when inflated. The part of the side airbag corresponding to the rear deployment zone is immediately deployed and inflated with gas generated by an inflator of the side airbag apparatus. Thereafter, the part of the side airbag corresponding to the front deployment zone is deployed and inflated.

The entire side airbag is deployed and inflated at the same internal pressure and in the same manner. Therefore, when an occupant presses himself against the side airbag, the internal pressure of the side airbag is increased according to the degree of the pressing. Accordingly, the reaction force applied to the occupant by the side airbag is increased.

Some side airbags have a vent hole to discharge excessive portion of gas supplied by the inflator to the outside of the side airbag. In an initial stage of restraint of an occupant by such a side airbag, the pressure in the side airbag is less than a case where no vent hole is provided as shown by broken line C1, which represents the characteristics of such a side airbag. This is because gas is discharged to the outside from the side airbag through the vent hole. Therefore, to adjust the reaction force that acts on an occupant to a predetermined value in an initial stage of restraint of an occupant, either the output of the inflator needs to be increased or the capacity of the airbag needs to be reduced.

SUMMARY OF THE INVENTION

Accordingly, it is an objective of the present invention to adjust the pressure in a side airbag when protecting an occupant to an appropriate level, thereby improving the occupant protection performance.

To achieve the foregoing and other objectives and in accordance with the purpose of the present invention, a side airbag for protecting an occupant seated on a seat of a vehicle is provided. The side airbag includes a airbag main body, and a pressure adjuster. When an impact that is equal to or greater than a predetermined value is applied to a body side portion of the vehicle, the airbag main body is deployed between the occupant and the body side portion. The airbag main body has a predetermined inflation space. The pressure adjuster adjusts an internal pressure of the inflation space. The pressure adjuster includes a passage provided in a joined section, at which opposing sections of the airbag main body are joined. The passage permits gas in the inflation space to pass therethrough to the outside of the inflation space.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 is a side view illustrating a deployed state of a side airbag according to a third embodiment;

FIG. 12 is a cross-sectional view of the airbag shown in FIG. 11;

FIG. 13 is a cross-sectional view taken along line 13—13 of FIG. 12;

FIG. 14 is a cross-sectional view of an airbag according to a fourth embodiment;

FIG. 15 is a cross-sectional view of an airbag according to a modification of the third embodiment;

FIG. 16 is a cross-sectional view of an airbag according to another modification of the third embodiment;

FIG. 17 is a cross-sectional view of an airbag according to another modification of the third embodiment;

FIG. 18 is a cross-sectional view of an airbag according to another modification of the third embodiment;

FIG. 19 is a cross-sectional view of an airbag according to another modification of the third embodiment; and FIG. 20 is a cross-sectional view of an airbag according to another modification of the third embodiment.

DETAILED DESCRIPTION OF THE PREFERRED EMBODIMENTS

A first embodiment according to the present invention will now be described with reference to FIGS. 1 to 2(b).

Figure 1:
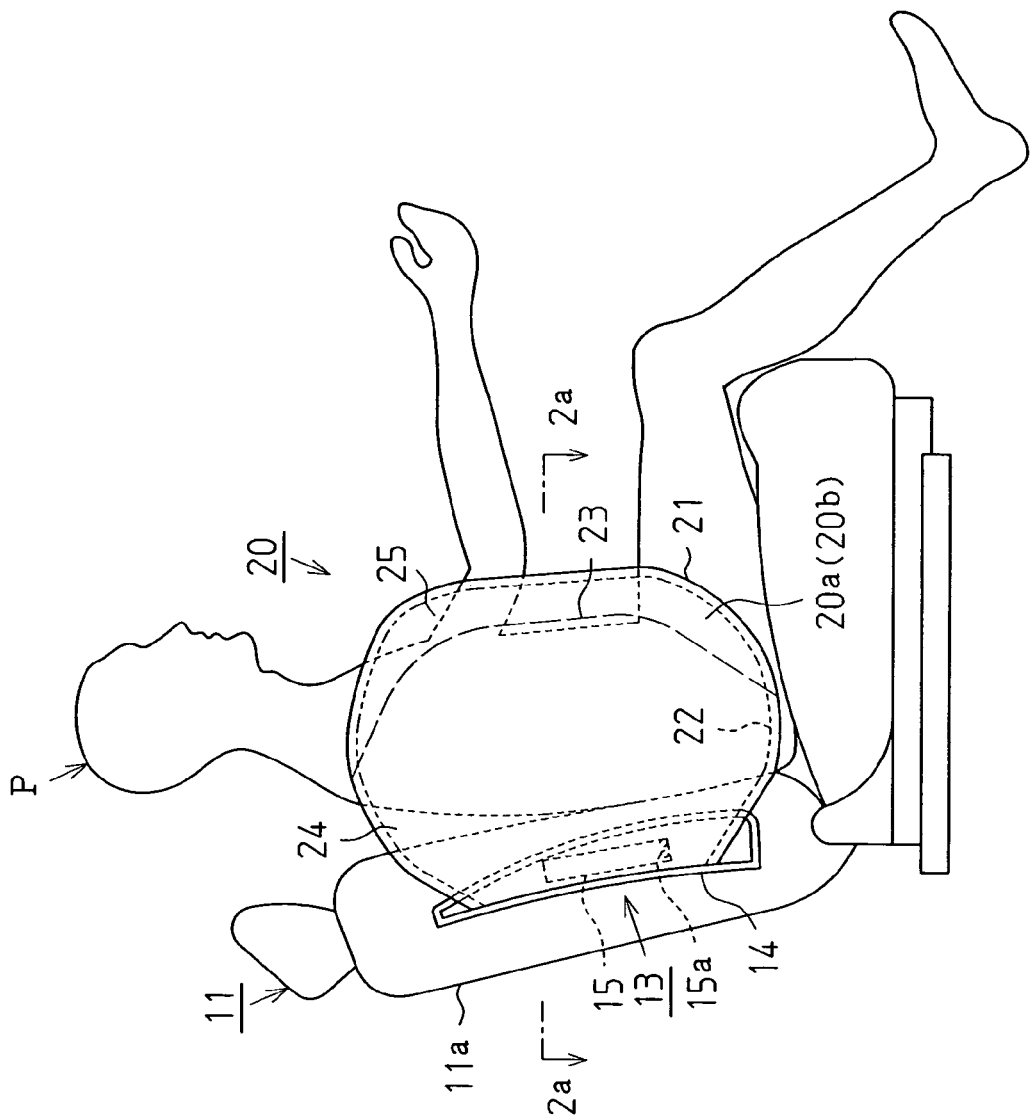
FIG. 1 is a side view illustrating a deployed and inflated state of a side airbag according to a first embodiment of the present invention.

FIG. 1 shows a front seat 11 located in a passenger compartment of a vehicle. The front seat 11 has a backrest 11a. As shown in FIGS. 2(a) and 2(b), a side airbag apparatus 13 that is accommodated in a case 14 is incorporated in a side of the backrest 11a. The side airbag apparatus 13 corresponds to a door 12, which forms part of a body side portion of the vehicle. Although FIGS. 1, 2(a), and 2(b) only show the driver's seat as the front seat 11, the same side airbag apparatus is incorporated in a side of a front passenger seat.

As shown in FIG. 1, the side airbag apparatus 13 includes a gas generator, which is an inflator 15, and a side airbag 20. The inflator 15 is fixed in the case 14. The inflator 15 generates gas and supplies the gas to the side airbag 20. The inflator 15 has a case and gas generating agent (not shown) in the case. The gas generating agent generates gas to deploy and inflate the side airbag 20. A gas port 15a for discharging the gas is formed in a lower portion of the case.

The inflator 15 is electrically connected to a sensor (not shown) that detects impact applied to the body side portion. When another vehicle collides with the body side portion and the impact of the collision is equal to or greater than a predetermined value, the sensor sends a detection signal to a control circuit (not shown). The control circuit, in turn, supplies drive current to the inflator 15.

As shown in FIGS. 1 and 2(a), the side airbag 20 includes an airbag main body 21. The airbag main body 21 is formed, for example, of a pair of woven fabric sheets 20a, 20b. The airbag main body 21 is formed by overlaying the fabric sheets 20a, 20b on each other and sewing the peripheral portions of the fabric sheets 20a, 20b to form a peripheral sewn portion 22. The side airbag 20 is accommodated in the case 14 in a folded state.

The peripheral sewn portion 22 is formed by lockstitch with 3 mm pitch using sewing threads (upper thread and lower thread) made of polyamide 66. The size of the threads is 1680-denier, and the tensile strength is 100 to 200 newtons. The types of the threads and stitch are not limited to the ones listed above. That is, the sewing threads may be made of, for example, polyester, and the stitches may be chain stitches or basting stitches. Also, the size and the tensile strength of the sewing threads may be changed as necessary according to the amount of gas supplied by the inflator 15 and the size of the side airbag 20.

As shown in FIGS. 1 and 2(a), the fabric sheets 20a, 20b are joined at joined section. A seam 23 is formed in the joined section. The seam 23 extends from an upper end to a lower end of the airbag main body 21 along the front sides of the thorax and the abdomen of an occupant. In this embodiment, the seam 23 functions as a pressure adjuster. The seam 23 divides the interior of the side airbag 20 into predetermined inflation spaces, which are a main inflation chamber 24 and a sub-inflation chamber 25.

The seam 23 is formed by lockstitch with 3 mm pitch using sewing threads (upper thread 23a and lower thread 23b) made of polyamide 66. The size of the threads is 1260-denier, and the tensile strength is 100 to 200 newtons.

Figure 1A:
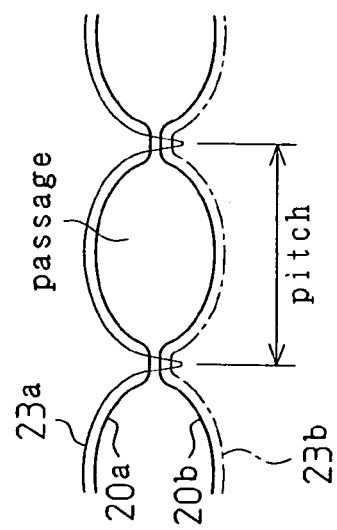
FIG. 1(a) is a cross-sectional view illustrating a seam of the side airbag shown in FIG. 1.

FIG. 1(a) is a cross-sectional view showing the seam 23. The seam 23 is formed by lockstitching the fabric sheets 20a, 20b with a sewing pitch of 6 mm. Relatively large passages are formed at the intertwined portions of the upper thread 23a and the lower thread 23b forming the seam 23, which is a sewn portion. The passages permit gas in the inflation spaces to pass therethrough to the outside of the inflation spaces.

The types of the threads and stitch are not limited to the ones listed above. The sewing threads may be made of, for example, polyester, and the stitches may be chain stitches or basting stitches. Also, the sewing pitch, the size and the tensile strength of the sewing threads may be changed as necessary according to the amount of gas supplied by the inflator 15 and the size of the side airbag 20. The sewing pitch is preferably in a range no less than 4 mm and no more than 9 mm because if the pitch is in this range, the reaction that acts on the occupant P is readily reduced when the occupant P is pressed against the inflated and deployed main inflation chamber 24.

When deployed and inflated, the main inflation chamber 24 is at a position that corresponds to part of the body of the occupant P from a shoulder to the lumbar region. When inflated, the sub-inflation chamber 25 is located at a front side of the main inflation chamber 24 with respect to the moving direction of the vehicle. When the side airbag 20 is deployed and inflated, gas generated in the inflator 15 is supplied to the main inflation chamber 24 of the airbag main body 21. Some of the gas supplied to the main inflation chamber 24 flows into the sub-inflation chamber 25 through the seam 23. In this description, the phrase "when the side airbag 20 is deployed and inflated" refers to a state where the side airbag 20 is inflated to its maximum size.

The operation of the side airbag apparatus 13 will now be described.

When another vehicle collides with the body side portion and the impact of the collision is equal to or greater than a predetermined value, the sensor detects the impact and sends a detection signal to the control circuit. The control circuit, in turn, supplies drive current to the inflator 15. The drive current ignites gas generating agent in the inflator 15, which generates gas.

The generated gas is supplied to the main inflation chamber 24 of the airbag main body through the gas port 15a of the inflator 15. This inflates the main inflation chamber 24 in the case 14 and increases the pressure in the main inflation chamber 24. Accordingly, the airbag main body 21 protrudes into the passenger compartment from the case 14. Then, as shown in FIG. 2(a), the entire main inflation chamber 24 is instantly deployed and inflated between the occupant P seated on the front seat 11 and the door 12. Thereafter, as shown in FIG. 2(b), the occupant P seated on the front seat 11 contacts and presses a part of the airbag main body 21 that corresponds to the main inflation chamber 24. Part of the body of the occupant P from a shoulder to the lumber region is received by the part of the airbag main body 21 that corresponds to the main inflation chamber 24.

When the occupant presses part of the fabric sheet 20b that corresponds to the main inflation chamber 24, the pressing force of the occupant P causes some of the gas in the main inflation chamber 24 to the sub-inflation chamber 25 through the passages at the seam 23 between the fabric sheets 20a, 20b. The sub-inflation chamber 25 is inflated with gas from the main inflation chamber 24, which reduces the pressure in the main inflation chamber 24.

Figure 10:
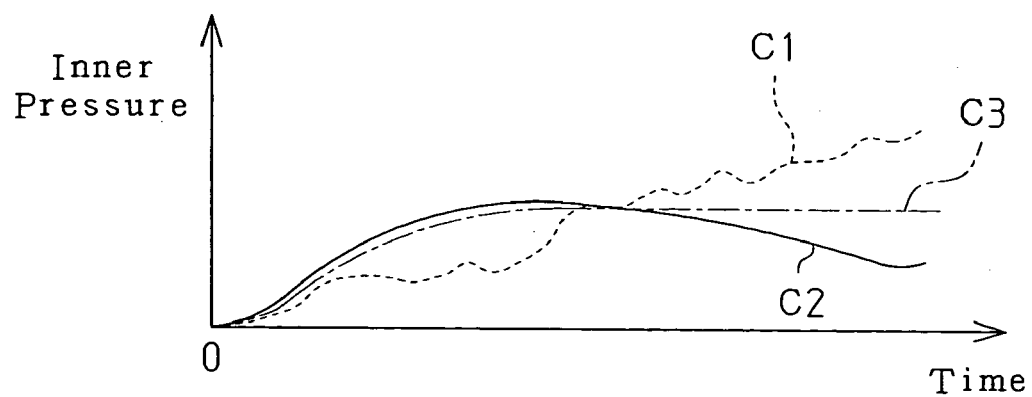
FIG. 10 is a graph showing changes of the internal pressure of a side airbag with respect to elapsed time from when the airbag receives an occupant.

A characteristic C2 shown by a solid line in FIG. 10 represents pressure changes in the main inflation chamber 24 when the side airbag 20 according to this embodiment is deployed and inflated. When the occupant P is protected by the side airbag 20, the amount of pressing by the occupant P of part of the airbag main body 21 that corresponds to the main inflation chamber 24 is relatively small from an initial stage to an intermediate stage of restraint of the occupant P by the part of the fabric sheet 20b that corresponds to the main inflation chamber 24. In this period, little gas flows to the sub-inflation chamber 25 from the main inflation chamber 24 through the passages of the seam 23. Therefore, as shown by the characteristic C2 in FIG. 10, the pressure in the main inflation chamber 24 is maintained to a value proximate to a predetermined pressure in the initial stage of pressing by the occupant P.

In a period from the intermediate stage to the final stage of the restraint, in which the amount of pressing by the occupant P is increased, the amount of gas that flows to the sub-inflation chamber 25 from the main inflation chamber 24 through the passages in the seam 23 is increased in response to the pressing by the occupant P. Therefore, as shown by the characteristic C2 in FIG. 10, the pressure in the main inflation chamber 24 is prevented from increasing. In FIG. 10, as shown by characteristic C3 of an alternate long and short dash line, to improve the protection performance for the occupant P, the seam 23 is preferably configured such that the pressure in the main inflation chamber 24 is constant in a period from the intermediate stage to the final stage of the restraint of the occupant P.

This embodiment provides the following advantages.

When the occupant P is received by the part of the airbag main body 21 that corresponds to the main inflation chamber 24, the pressure in the main inflation chamber 24 is maintained at a sufficient level in the initial stage of the inflation. At the same time, the pressure in the main inflation chamber 24 is prevented from increasing so that the reaction force of the airbag main body 21 based on the pressure in the main inflation chamber 24 that acts on the occupant P is reduced.

Specifically, in a period from the initial stage of the restraint of the occupant P to the intermediate stage, the pressure in the main inflation chamber 24 in an initial inflation stage is maintained sufficiently high so that the reaction force acting on the occupant P is made proximate to the predetermined value. This improves the initial restraining performance for the occupant P of the side airbag 20. In a period from the intermediate stage to the final stage of the restraint, the pressure in the main inflation chamber 24 is prevented from increasing. This prevents the reaction force acting on the occupant P from being excessive. This improves the protection performance for the occupant P of the side airbag 20.

The passages connecting the main inflation chamber 24 with the sub-inflation chamber 25 are formed by sewing the airbag main body 21 (the fabric sheets 20a, 20b) with sewing threads. The passages are therefore easily formed in the airbag main body 21.

The sub-inflation chamber 25 is located at a front side of the main inflation chamber 24 with respect to the moving direction of the vehicle. Since the sub-inflation chamber 25 is inflated with gas supplied from the main inflation chamber 24 through the seam 23, the area of the side airbag 20 for protecting the occupant P is expanded forward in the vehicle. Therefore, when another vehicle collides with the body side portion, an arm of the occupant P is protected.

The seam 23 extends from an upper end to a lower end of the airbag main body 21 along the thorax and the abdomen of an occupant. The main inflation chamber 24 is located in a position that corresponds to the thorax of the occupant P. Therefore, when the occupant P is received by the part of the airbag main body 21 that corresponds to the main inflation chamber 24, the thorax of the occupant P is reliably protected.

Figure 2:
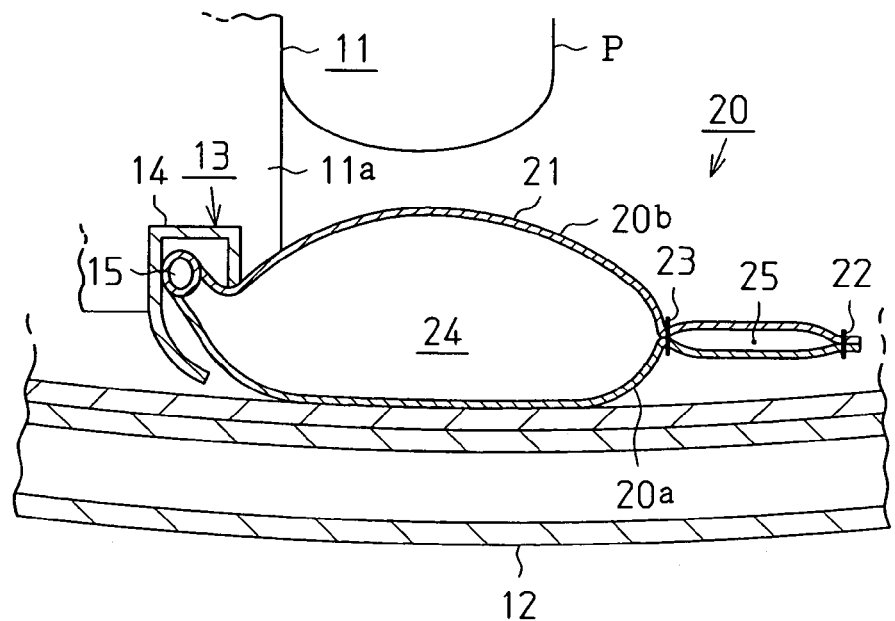
FIG. 2(a) is a cross-sectional view illustrating the side airbag shown in FIG. 1 before an occupant contacts the side airbag.
FIG. 2(b) is a cross-sectional view illustrating the side airbag shown in FIG. 1 after an occupant contacts the side airbag.
Figure 2:
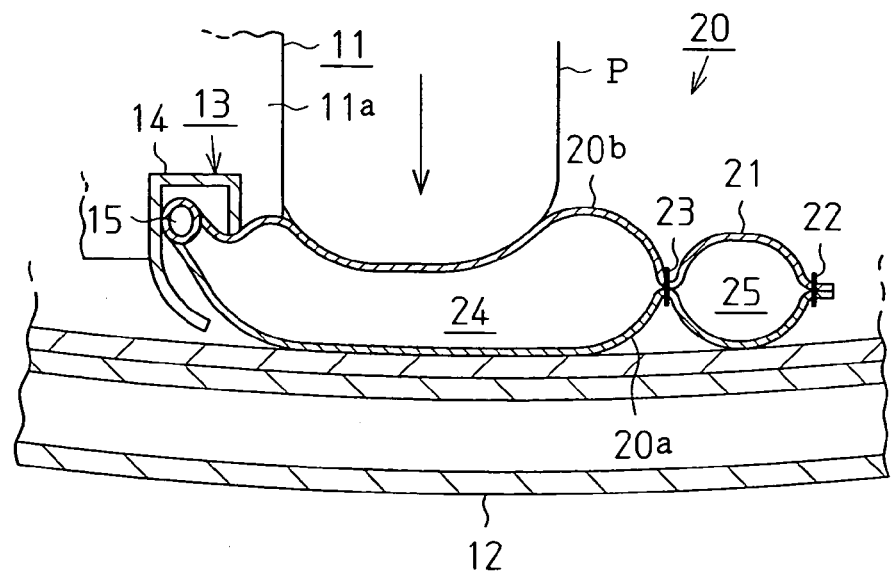

The first embodiment shown in FIGS. 1 to 2(b) may be modified as shown in FIGS. 3 to 8.

Figure 3:
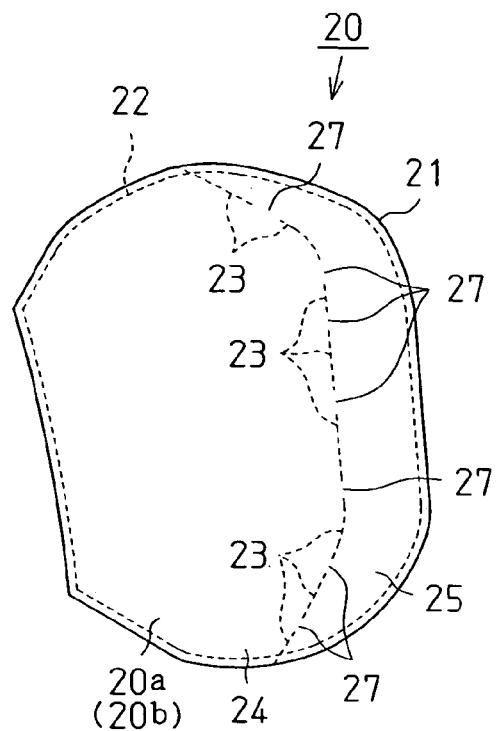
FIG. 3 is a side view illustrating a deployed state of a side airbag according to a modification of the first embodiment.

In a modification shown in FIG. 3, seams 23 are intermittently formed in the airbag main body 21 to define the main inflation chamber 24 and the sub-inflation chamber 25. In this case, some of gas in the main inflation chamber 24 is caused to flow to the sub-inflation chamber 25 by the pressing of the occupant P through passages (interstices) between the fabric sheets 20a, 20b, which passages are formed at non-sewn sections 27 each provided between an adjacent pair of the seams 23.

Figure 4:
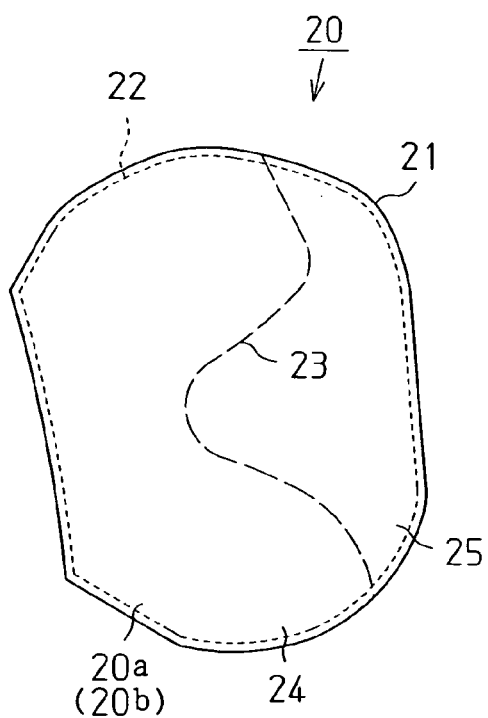
FIG. 4 is a side view illustrating a deployed state of a side airbag according to another modification of the first embodiment.

In a modification shown in FIG. 4, the seam 23 is formed to pass through a part of the airbag main body 21 that corresponds to the thorax of the occupant P. The seam 23 limits the inflation of the main inflation chamber 24 in the lateral direction of the vehicle.

In this case, the amount of lateral inflation of the part of the main inflation chamber 24 that corresponds to the thorax of the occupant P is less than the amount of lateral inflation of the part of the main inflation chamber 24 that corresponds to a shoulder and the lumbar region of the occupant P. This configuration reduces reaction force of the airbag main body 21 that acts on the thorax of the occupant P when the occupant P presses the part of the airbag main body 21 that corresponds to the main inflation chamber 24. Accordingly, the thorax is effectively protected.

Figure 5:
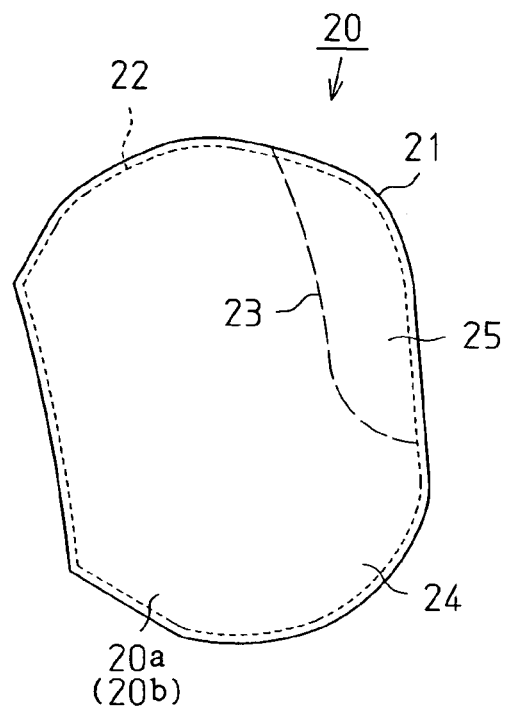
FIG. 5 is a side view illustrating a deployed state of a side airbag according to another modification of the first embodiment.

As shown in FIG. 5, the seam 23 may be formed in a front and upper section of the main inflation chamber 24 with respect to the moving direction of the vehicle. Specifically, the seam 23 may extend from the upper edge to the middle portion of the airbag main body 21 along the front side of the thorax of the occupant P. In this configuration, the seam 23 is not formed in part of the airbag main body 21 that corresponds to the lumbar region of the occupant P. When the main inflation chamber 24 is deployed and inflated, the amount of lateral inflation is increased at part of the main inflation chamber 24 of the airbag main body 21 that corresponds to the lumbar region of the occupant P.

Figure 6:
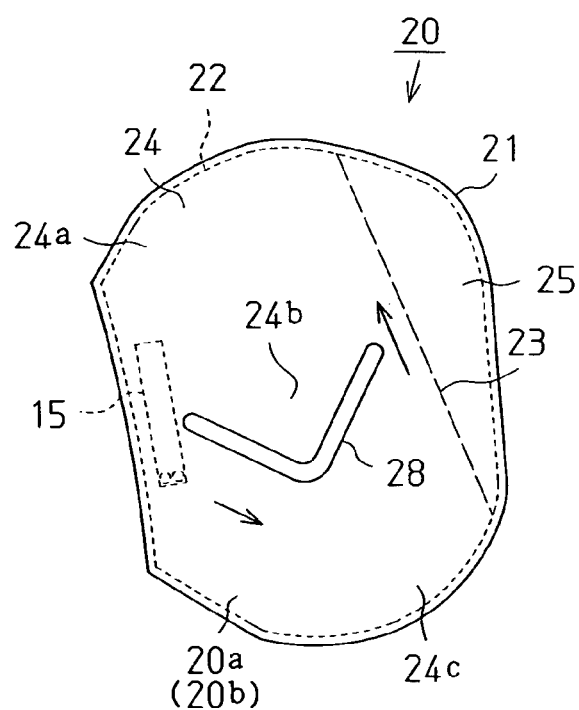
FIG. 6 is a side view illustrating a deployed state of a side airbag according to another modification of the first embodiment.

In a modification shown in FIG. 6, a seam 28 is formed in the airbag main body 21 such that an upper chamber 24a that corresponds to a shoulder of the occupant P, a middle chamber 24b that corresponds to the thorax of the occupant P, and a lower chamber 24c that corresponds to the lumbar region of the occupant P are defined in the main inflation chamber 24. In this case, the seam 23 between the main inflation chamber 24 and the sub-inflation chamber 25 may be formed to extend from the top edge to a middle portion of the airbag main body 21.

Figure 7:
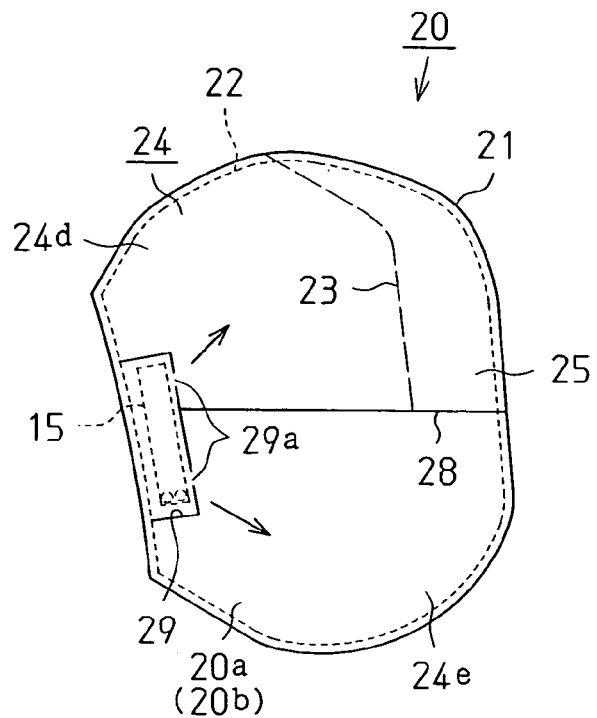
FIG. 7 is a side view illustrating a deployed state of a side airbag according to another modification of the first embodiment.

In a modification shown in FIG. 7, a seam 28 divides the interior of the airbag main body 21 into an upper chamber 24d and a lower chamber 24e. A sub-inflation chamber 25 as in the modification of FIG. 6 is provided in the upper chamber 24d.

In the side airbag 20 of the modification shown in FIG. 6, gas supplied by the inflator passes through the lower chamber 24c, the upper chamber 24a, and the middle chamber 24b in this order. On the other hand, in the side airbag 20 of the modification shown in FIG. 7, gas from the inflator 15 is supplied to the upper chamber 24d and the lower chamber 24e through upper and lower openings 29a of a surrounding chamber 29 that surrounds the inflator 15 in the airbag main body 21.

Figure 8:
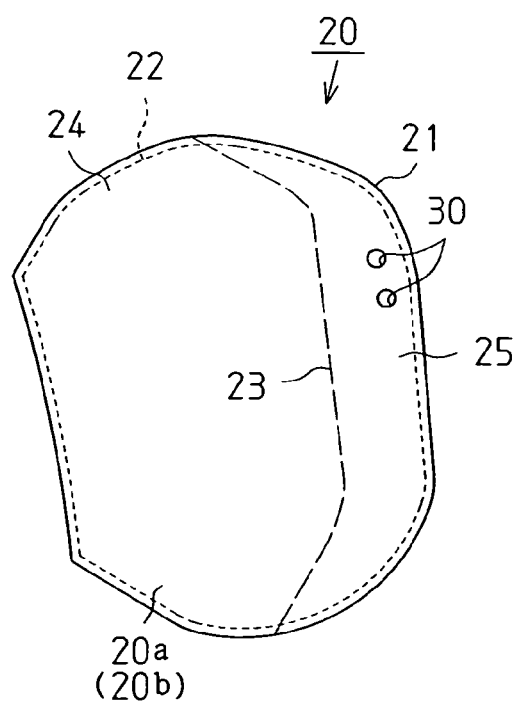
FIG. 8 is a side view illustrating a deployed state of a side airbag according to another modification of the first embodiment.

In a modification shown in FIG. 8, vent holes 30 are formed at positions corresponding to the sub-inflation chamber 25 of the airbag main body 21 to discharge some of gas in the sub-inflation chamber 25 to the outside (to the passenger compartment). This permits excessive gas in the sub-inflation chamber 25 to be discharged to the outside through the vent holes 30. The positions, the sizes, and the number of the vent hole 30 are not limited to those illustrated in FIG. 8, but may be changed as necessary according to the size of the side airbag 20 and the amount of gas supplied by the inflator 15.

The position of the sub-inflation chamber 25 is not limited to a position at a front side of the main inflation chamber 24 with respect to the moving direction of the vehicle. The sub-inflation chamber 25 may be located at least above or below the main inflation chamber 24 with respect to the vertical direction of the vehicle.

The airbag main body 21 may have two or more seams 23 so that two or more sub-inflation chambers 25 are defined. In this case, for example, a first sub-inflation chamber and a second sub-inflation chamber may be formed at the front side and at the rear side of the main inflation chamber 24 with respect to the moving direction of the vehicle, respectively.

A second embodiment of the present invention will now be described with reference to FIGS. 8 and 9. The differences from the embodiment shown in FIGS. 1 to 2(b) will mainly be discussed.

Figure 9:
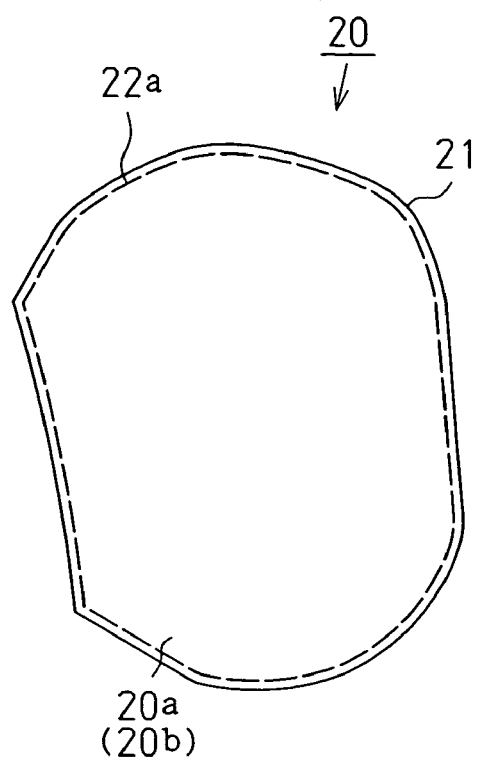
FIG. 9 is a side view illustrating a deployed state of a side airbag according to a second embodiment.

Unlike the embodiment of FIGS. 1 to 2(b), a airbag main body 21 of a side airbag 20 has no seam 23 as shown in FIG. 9. Instead, a peripheral sewn portion 22a, which functions as a joined section, is provided. The peripheral sewn portion 22a has passages connecting the interior of the airbag main body 21 with the outside. Relatively large passages are formed in the peripheral sewn portion 22a at the intertwined portions of the upper thread and the lower thread, which are sewing threads. The sewing threads for sewing the peripheral sewn portion 22a may be the same threads used for sewing the seam 23 of the embodiment shown in FIGS. 1 to 2(b). The sewing pitch and the type of the stitch of the peripheral sewn portion 22a may be changed like the seam 23.

When the inflator 15 supplies gas, the entire airbag main body 21 is instantly deployed and inflated between an occupant P seated on the front seat 11 and the door 12. Impact applied to the vehicle causes the occupant P to contact the inflated and deployed airbag main body 21, and the body of the occupant from the lumbar region to a shoulder is received by the airbag main body 21.

In this state, some of the gas in the airbag main body 21 is discharged to the outside of the airbag main body 21, or to the passenger compartment, by pressing force applied by the occupant P. The pressure in the airbag main body 21 is reduced, accordingly.

In a period from the initial stage of the restraint of the occupant P by the airbag main body 21 to the intermediate stage, the amount of gas discharged to the passenger compartment from the airbag main body 21 through the passages of the peripheral sewn portion 22a is small, which causes reaction force applied to the occupant P from the airbag main body 21 to seek a predetermined value. In a period from the intermediate stage to the final stage of the restraint of the occupant P, the pressing of the airbag main body 21 by the occupant P increases the amount of gas discharged to the passenger compartment through the passages in the peripheral sewn portion 22a. Therefore, the reaction force received by the occupant P is prevented from being increased according to an increase in the pressing amount of the main inflation chamber 24 by the occupant P.

This embodiment has the same advantages as those of the embodiment shown in FIGS. 1 to 2(b), and improves the initial restraining performance for the occupant P of the side airbag 20. In a period from the intermediate stage to the final stage of the restraint, the pressure in the main inflation chamber 24 is prevented from increasing. This prevents the reaction force acting on the occupant P by the main inflation chamber 24 from being excessive. This improves the protection performance for the occupant P of the side airbag 20.

Further, the peripheral sewn portion 22a is formed by sewing the airbag main body 21 (the fabric sheets 20a, 20b) with sewing threads. The peripheral sewn portion 22a is therefore easily formed in the airbag main body 21.

The second embodiment shown in FIG. 9 may be modified as follows.

The seam 23 of the first embodiment may be formed in the airbag main body 21. This configuration permits some of gas in the main inflation chamber of the airbag main body 21 to be discharged to a sub-inflation chamber and the passenger compartment through the passages defined by the seam 23 and the peripheral sewn portion 22a. Accordingly, the pressure in the main-inflation chamber is readily reduced.

The embodiments shown in FIGS. 1 to 9 may be modified as follows.

The sewing pitch of the seam 23 and the peripheral sewn portion 22a may be locally made small in one or more predetermined sections. That is, in the seam 23 and the peripheral sewn portion 22a, passages through which gas from the airbag main body 21 can pass may be partly formed. This configuration also permits the pressure in the airbag main body 21 to be adjusted.

In the embodiments of FIGS. 1 to 9, the passages are formed by sewing the fabric sheets 20a and 20b to each other. However, the passages may be formed by other methods. The passages may be formed by adhering or welding the facing parts of the fabric sheets 20a, 20b. In this case, adhered or welded portions are formed intermittently to form interstices that permit passage of gas in the airbag main body 21.

The airbag main body 21 may be formed by mountain folding a single fabric sheet and sewing the peripheral portion of the folded fabric sheet. The airbag main body 21 may be formed through a hollow weave. In this case, the passages may be formed during the hollow weave.

Instead of woven cloth, the airbag main body 21 may be formed with other materials, such as nonwoven fabric or synthetic resin sheets.

A third embodiment of the present invention will now be described with reference to FIGS. 11 to 13.

FIG. 11 shows a left front seat 121 located in a passenger compartment. The front seat 121 includes a seat portion 121a and a backrest 121b. A side airbag apparatus 122, which is accommodated in a case 123, is provided at a lift side of the backrest 121b. The side airbag apparatus 122 corresponds to a door (not shown), which forms part of the body side portion of the vehicle. Although only the left front seat 121 is illustrated in the drawings, a right front seat has a similar airbag apparatus in its right portion.

The side airbag apparatus 122 includes a gas generator, which is an inflator 124, and an airbag 125. The inflator 124 is fixed in the case 123. The airbag 125 covers the inflator 124. The inflator 124 has a case and gas generating agent (not shown) in the case. The gas generating agent generates gas to deploy and inflate the airbag 125. Gas ports 124a are provided at each of the upper and lower portions of an inflator 124. Gas generated by gas generating agent is injected through the gas ports 124a. The inflator 124 is electrically connected to a sensor (not shown) that detects impact applied to the body side portion.

As shown in FIGS. 11 and 13, the airbag 125 has a pair of fabric sheets 125a, 125b made of woven cloth. The fabric sheets 125a, 125b are sewn together at the periphery to form the airbag 125. The airbag 125 is accommodated in the case 123 in a folded state. A reinforcing sheet 133 is sewn to the inner sides of the fabric sheets 125a, 125b in a section from the lower part to the rear part of the airbag 125.

A pair of seams 126 are provided substantially at a center of the airbag 125 by sewing the fabric sheets 125a, 125b to each other without interstice in between. The seams 126 are spaced from each other and arranged vertically. The seams 126 extend along the running direction of the vehicle in a wavy manner. One end of each seam 126 reaches the front end of the airbag 125. The other end of each seam 126 extends to a position that is rear of the center of the airbag 125 with respect to the running direction of the vehicle but does not reach the rear end of the airbag 125. The distance between the seams 126 gradually widens from the rear portion to the front portion of the airbag 125, then starts gradually narrowing substantially at the center of the airbag 125. The distance then gradually widens toward the front end of the airbag 25.

The seam 126 divides the interior of the airbag 125 into an upper chamber 127, a middle chamber 128, and a lower chamber 129. The upper chamber 127, the middle chamber 128, and the lower chamber 129 communicate with one another at the rear ends. The upper and lower gas ports 124a of the inflator 124 are located in the upper chamber 127 and the lower chamber 129, respectively.

When the airbag 125 is deployed and inflated, the upper chamber 127, the middle chamber 128, and the lower chamber 129 are located at positions corresponding to a shoulder, the thorax, and a lumbar region of the occupant P seated on the front seat 121, respectively.

A discharge portion 130 is provided at the front end of the middle chamber 128. The discharge portion 130 is capable of discharging gas supplied from the inflator 124 to the outside of the airbag 125. The discharge portion 130 functions in the same manner as the seam 23 of the embodiment shown in FIGS. 1 to 2(b), and the peripheral sewn portion 22a of the embodiment shown in FIG. 9. The fabric sheets 125a, 125b are sewn together at the periphery. In a section of the sewn periphery that corresponds to the space between the seams 126, the overall sewing pitch is in a range no less than 5 mm and no more than 10 mm. Alternatively, the sewing pitch is partly 20 mm. This section is the discharge portion 130, which contains interstices, or non-sewn sections. Gas passes through the non-sewn sections (the discharge portion 130). The non-sewn sections correspond to a portion between tightly sewn portions (seams). In a normal state, the sections of the fabric sheets 125a, 125b that correspond to the non-sewn sections contact each other and are closed. When the pressure of gas in the middle chamber 128 reaches a predetermined value, the non-sewn sections (the discharge portion 130) are opened to permit gas to through therethrough.

Further, in a center of the middle chamber 128 with respect to the moving direction of the vehicle, that is a section upstream of the discharge portion 130 in the flow of gas, a flow limiting portion 132 for limiting the amount of gas flow. The flow limiting portion 132 also functions in the same manner as the seam 23 of the embodiment shown in FIGS. 1 to 2(b), and the peripheral sewn portion 22a of the embodiment shown in FIG. 9. The flow limiting portion 132 is formed by sewing the fabric sheets 125a, 125b and extends between the upper and lower seams 126. Like the discharge portion 130, the flow limiting portion 132 is formed with a large sewing pitch (the pitch is constantly in a range from 5 mm to 10 mm, or partly 20 mm) so that gas passes therethrough. In the middle chamber 128, a space between the discharge portion 130 and the flow limiting portion 132 is a reservoir chamber 131 for storing gas.

The operation of the side airbag apparatus 122 will now be described wither reference to FIGS. 11 to 13.

In the human body, shoulders and lumbar regions are known to have a better impact resistance than the thorax (abdomen). Therefore, in a case of an airbag designed for protecting a shoulder and the lumbar region of an occupant, impact applied to the occupant by deployment and inflation of the airbag is preferably less in the thorax than in the shoulder of the lumbar region.

When another vehicle collides with the body side portion and the impact of the collision is equal to or greater than a predetermined value, the sensor sends a detection signal to the control circuit. The control circuit, in turn, outputs a driving current to the inflator 124. The drive current generates heat, which causes the gas generating agent in the inflator 124 to generate gas. The gas is simultaneously injected as flow of gas into the upper chamber 127 and the lower chamber 129 through the upper and lower gas ports 124a of the inflator 124 as shown by arrows in FIG. 12.

After the upper chamber 127 and the lower chamber 129 are filled with the gas, the increased pressure in the upper and lower chambers 127, 129 pushes gas to flow along arrows in FIG. 12 into the rear portion of the middle chamber 128. When the flow of gas increases the pressure in the rear portion of the middle chamber 128 to a predetermined level, the non-sewn sections of the flow limiting portion 132 is opened. Gas then flows into the reservoir chamber 131 while its flow rate is limited by the non-sewn sections.

Thereafter, when the amount of gas stored in the reservoir chamber 131 is increased and the pressure in the reservoir chamber 131 surpasses a predetermined value, the non-sewn sections of the discharge portion 130 are opened. This permits gas to be discharged to the outside of the airbag 125 through the non-sewn sections of the discharge portion 130, while the gas flow is limited by the non-sewn sections of the discharge portion 130. When gas is discharged from the reservoir chamber 131 and the pressure in the reservoir chamber 131 drops below a predetermined value, the discharge portion 130 is closed. At this time, gas is stopped being discharged from the reservoir chamber 131 to the outside of the airbag 125. Therefore, when the airbag 125 is deployed and inflated, the pressure in the middle chamber 128 is lower than those in the upper chamber 127 and the lower chamber 129.

Thus, a shoulder and the lumbar region of the occupant P seated on the front seat 121 are reliably protected by a high pressure in the upper chamber 127 and the lower chamber 129, and the thorax is gently protected by the low pressure in the middle chamber 128.

This embodiment provides the following advantages.

The interior of the airbag 125 is divided into the three chambers, or the upper chamber 127, the middle chamber 128, and the lower chamber 129. When the airbag 125 is deployed and inflated, the pressure in the middle chamber 128 is lower than those in the upper chamber 127 and the lower chamber 129. Therefore, impact applied to the thorax, which has a lower impact resistance than the shoulders and the lumbar region, is reduced. As a result, the thorax of the occupant P is more gently protected than the shoulder and the lumbar region. The occupant P is thus effectively protected.

When the airbag 125 is deployed and inflated, the flow limiting portion 132 limits the flow gas from the middle chamber 128 through the reservoir chamber 131. Also, gas is discharged to the outside from the reservoir chamber 131. Thus, the pressure in the middle chamber 128 is decreased in stages (gradually) As a result, the thorax of the occupant P is softly protected compared to the shoulder and the lumbar region. The occupant P is therefore effectively protected. Since the chambers 127, 128, 129 are defined by the pair of the upper and lower seams 126, the structure is simple.

The discharge portion 130 maintain the pressure in the reservoir chamber 131 no greater than a predetermined value, which permits the thorax of the occupant P to be gently protected compared to the shoulder and the lumbar region.

A fourth embodiment of the present invention will now be described with reference to FIG. 14. The differences from the embodiment shown in FIGS. 11 to 13 will mainly be discussed.

As shown in FIG. 14, an inner bag 134 is provided in an airbag 125. The inner bag 134 is formed of fabric sheets and is shaped like the letter U. The interior of the inner bag 134 is divided into an upper chamber 134a and a lower chamber 134b, which communicate with each other. An inflator 124 is provided in the center of the rear end portion of the inner bag 134. Gas ports 124a provided at the upper and lower portions of the inflator 124 are located in the upper chamber 134a and the lower chamber 134b.

In an area from the front portion to the middle portion of the airbag 125, a middle chamber 135 is provided between the upper chamber 134a and the lower chamber 134b. The discharge portion 130 is formed at the front end of the middle chamber 135. When the airbag 125 is deployed and inflated, the upper chamber 134a and the lower chamber 134b are located at positions corresponding to the shoulder and the lumbar region of the occupant P, respectively. The middle chamber 135 is located at a position corresponding to the thorax of the occupant P.

Holes 136 are formed in the lower rear portion of the upper chamber 134a of the inner bag 134. The diameter of the holes 136 is approximately 20 mm. The holes 136 connect the upper chamber 134a with the middle chamber 135. A open sewn portion 137, which is sewn with a large pitch (5 mm to 10 mm), is formed in an upper rear portion of the lower chamber 134b. The open sewn portion 137 connects the lower chamber 134b with the middle chamber 135. The total opening area of the holes 136 is preferably greater than the total opening area of the open sewn portion 137.

For example, when another vehicle collides with the body side portion of the vehicle, the gas generating agent in the inflator 124 generates gas. The generated gas is simultaneously injected as flow of gas into the upper chamber 134a and the lower chamber 134b through the upper and lower gas ports 124a of the inflator 124 as shown by arrows in FIG. 14. Therefore, the inner bag 134 is deployed and inflated first so that the shoulder and the thorax of the occupant P are securely protected.

Gas that fills the upper chamber 134a and the lower chamber 134b flows into the middle chamber 135 through the holes 136 and the open sewn portion 137. At this time, the holes 136 and the open sewn portion 137 limit the gas flow. Thereafter, when the middle chamber 135 is filled with gas, the pressure in the middle chamber 135 is increased. The gas in the middle chamber 135 is discharged to the outside of the airbag 125 through the discharge portion 130.

This embodiment provides the following advantages.

When the airbag 125 is deployed and inflated, the inner bag 134 is first deployed and inflated. Therefore, impact applied to the thorax, which has a lower impact resistance than the shoulders and the lumbar region, is reduced. As a result, the thorax of the occupant P is more gently protected than the shoulder and the lumbar region. The occupant P is thus effectively protected.

Since the total opening area of the open sewn portion 137 is greater than the total opening area of the holes 136, the flow rate of gas flowing through the holes 136 is great than the flow rate of gas flowing through the open sewn portion 137. Therefore, when the airbag 125 is inflated and deployed, the pressure in the upper chamber 134a is lower than the pressure in the lower chamber 134b. Accordingly, the shoulder of the occupant P is gently protected than the lumbar region.

By changing the size of the holes 136 and the size of the open sewn portion 137 as necessary, the pressure distribution of the airbag 125 is easily controlled.

The embodiment of FIGS. 11 to 13 may be modified as follows.

As shown in FIG. 15, a discharged gas reservoir chamber 138 to store gas discharged from the discharge portion 130 may be provided in a front end of the airbag 125.

As shown in FIG. 16, the upper gas ports 124a may be omitted from the embodiment shown in FIG. 12, and a diffuser pipe 139 may be provided. The diffuser pipe 139 guides some of the gas discharged through the lower gas ports 124a to the upper chamber 127.

As shown in FIG. 17, a pair of linear seams 126 may be provided. The seams 126 are parallel to each other and extend linearly along the moving direction of the vehicle.

As shown in FIG. 18, a pair of parallel and linear seams 126 may be formed. The seams 126 extend in the moving direction of the vehicle. The rear ends of the seams 126 are connected to each other with a seam 140. The seam 140 is formed continuously with the seams 126. A rear portion of each seam 126 is formed as open sewn portion 145 (similar to the open sewn portion 137 shown in FIG. 14).

As shown in FIG. 19, a pair of seams 126 that extend along the moving direction of the vehicle may be provided. The distance between the seams 126 decreases toward the rear end.

As shown in FIG. 20, the distance between a pair of seams 126 may be widened from the rear end to the front end with a constricted middle portion.

In the embodiment of FIGS. 11 to 13, the upper chamber 127 and the middle chamber 128 may be completely separated from each other so that gas cannot pass through the boundary between the upper chamber 127 and the middle chamber 128. Also, the lower chamber 129 and the middle chamber 128 may be completely separated from each other so that gas cannot pass through the boundary between the lower chamber 129 and the middle chamber 128.

The present invention may be applied to a side airbag of a side airbag apparatus provided in the door 12 of the vehicle shown in FIG. 2.

The present invention may be applied to a side airbag of a side airbag apparatus provided, for example, in a rear seat of a vehicle.

In the embodiment shown in FIGS. 11 to 13, the flow limiting portion 132 may be omitted.

Therefore, the present examples and embodiments are to be considered as illustrative and not restrictive and the invention is not to be limited to the details given herein, but may be modified within the scope and equivalence of the appended claims.

What is claimed is:

1. A side airbag for protecting an occupant seated on a seat of a vehicle, comprising:
   an airbag main body, wherein, when an impact that is equal to or greater than a predetermined value is applied to a body side portion of the vehicle, the airbag main body is deployed between the occupant and the body side portion, wherein the airbag main body has a predetermined inflation space; and
   a pressure adjuster for adjusting an internal pressure of the inflation space, wherein the pressure adjuster includes a passage provided in a joined section, at which opposing sections of the airbag main body are joined, and wherein the passage permits gas in the inflation space to pass therethrough to the outside of the inflation space,
   wherein the joined section is a sewn portion at which opposing sections of the airbag main body are sewn to each other, the sewn portion being formed by using a sewing thread at a predetermined sewing pitch, and wherein the passage is an interstice that is formed between the opposing sections of the airbag main body according to the sewing pitch.

2. The side airbag according to claim 1, wherein, when the airbag main body receives the occupant in an initial stage of deployment of the airbag main body, the pressure adjuster maintains the internal pressure of the airbag main body, and the pressure adjuster limits an increase of the internal pressure of the inflation space, thereby limiting a reaction force applied to the occupant by the airbag main body.

3. The side airbag according to claim 1, wherein the sewing thread comprises an upper thread and a lower thread, and wherein the passage is formed in an intertwined portion of the upper thread and the lower thread.

4. The side airbag according to claim 1, wherein the sewing pitch of the sewn portion is no less than 4 mm and no more than 9 mm.

5. The side airbag according to claim 1, wherein the sewing thread is made of polyamide 66, the size of the sewing thread is 1260-denier, and the tensile strength of the thread is no less than 100 newtons and no more than 200 newtons.

6. The side airbag according to claim 1, wherein the joined section divides the interior of the airbag main body into a main inflation chamber, which is the inflation space, and a sub-inflation chamber, and wherein the passage formed in the joined section permits gas in the main inflation chamber to flow to the sub-inflation chamber.

7. The side airbag according to claim 6, wherein, when the airbag main body is inflated, the sub-inflation chamber is located forward of the main inflation chamber with respect to the moving direction of the vehicle.

8. The side airbag according to claim 6, wherein the main inflation chamber is located in a position that corresponds to the thorax of the occupant.

9. The side airbag according to claim 1, wherein the joined section having the passage is formed at least in a part of a periphery of the airbag main body.

10. The side airbag according to claim 1, wherein an upper chamber, a middle chamber, and a lower chamber are defined in the airbag main body, wherein, when the airbag main body is deployed and inflated, the upper chamber, the middle chamber, and the lower chamber are arranged along a vertical direction of the vehicle, at least an adjacent pair of the chambers are connected with each other, gas is supplied to the upper chamber and the lower chamber before being supplied to the middle chamber, wherein the middle chamber is the inflation space, and wherein the passage permits gas in the middle chamber to be discharged to the outside of the airbag main body.

11. The side airbag according to claim 10, wherein, when the airbag main body is inflated, the upper chamber, the middle chamber, and the lower chamber correspond to a shoulder, the thorax, and the lumbar region of the occupant, respectively.

12. The side airbag according to claim 10, wherein a flow limiting portion is provided in the middle chamber in a section upstream of the passage with respect to the gas flow, wherein the flow limiting portion limits the flow rate of gas.

13. The side airbag according to claim 10, wherein at least an adjacent pair of the chambers are separated from each other by a seam, the seam being formed by sewing opposing sections of the airbag main body without interstice.

14. The side airbag according to claim 13, wherein the airbag main body is configured such that, when the airbag main body is deployed and inflated, a pressure of a part of the airbag main body that corresponds to the thorax of the occupant is lower than a pressure at a part of the airbag main body that corresponds to the shoulder and the lumbar region of the occupant.

15. The side airbag according to claim 13, wherein an inner bag is provided in a part of the airbag main body that corresponds to the shoulder and the lumbar region of the occupant, and wherein the inner bag is deployed and inflated initially.

* * * * *